March 26, 1963 H. I. SIDES 3,083,030
CART SUPPORT
Filed June 2, 1960
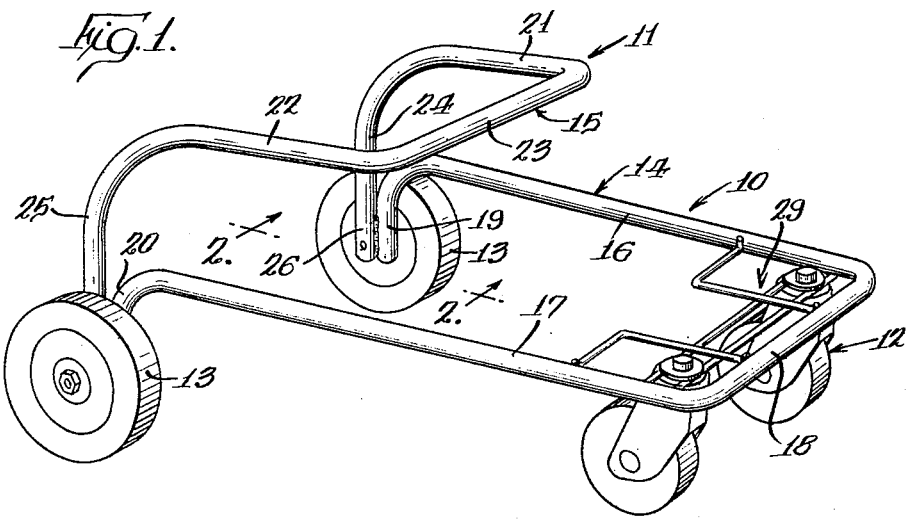
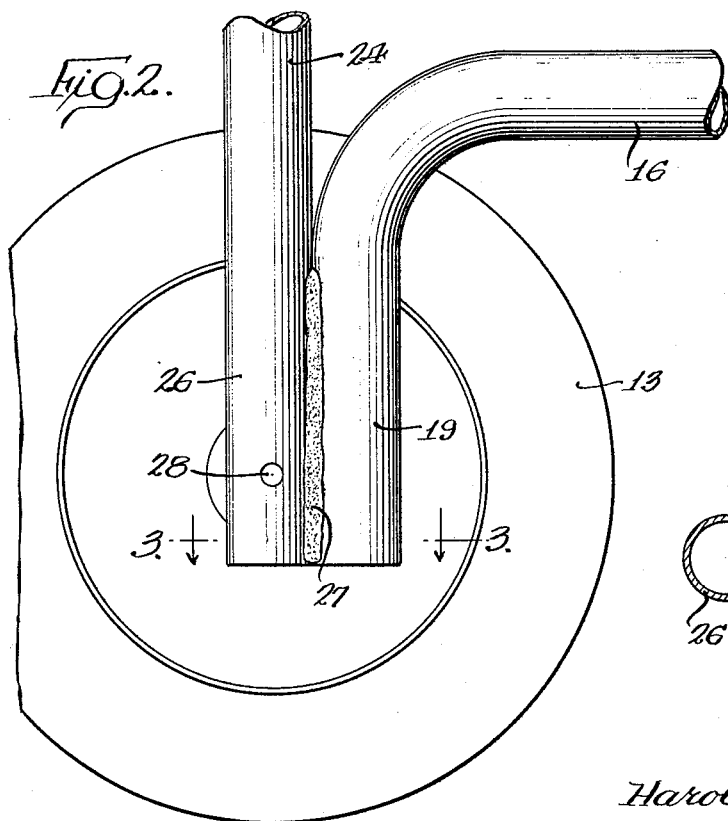
INVENTOR:
Harold I. Sides
BY
Hofgren, Brady, Wegner, Allen & Stellman
Attys United States Patent Office 3,083,030
Patented Mar. 26, 1963

3,083,030
CART SUPPORT
Harold I. Sides, Chicago, Ill., assignor to Tote-Cart Co., Chicago, Ill., a corporation of Illinois
Filed June 2, 1960, Ser. No. 33,473
1 Claim. (Cl. 280—79.1)

This invention relates to carts such as grocery carts, and in particular to support structures for use therein.

The base frame elements defining the support of a grocery type cart must be relatively strong and rigid, particularly where the cart is arranged for telescopic association with similar other carts. At times during the use of such grocery carts, relatively heavy goods are carried therein, the weight of which tends to deform the conventional base frame elements. Further, in such telescoping carts, substantial shock or impact forces are transmitted therethrough during the forcible telescoping association further tending to deform the base frame elements. Conventionally, the wheels or casters of the cart are carried by the base frame elements and deformation of the frame elements often results in improper rolling action. Another problem found in the known grocery carts is that, in order to make the base frame elements sufficiently rigid, relatively costly and complex structures are resorted to.

The present invention is concerned with a new and improved cart structure eliminating the above discussed problems. A principal feature of the present invention is, therefore, the provision of a new and improved cart structure.

Another feature of the invention is the provision of a new and improved base frame structure for use in grocery carts.

A further feature of the invention is the provision of such a base frame structure having simplified and economical construction while providing improved rigidity and strength.

Still another feature of the invention is the provision of such a base frame structure having new and improved means for maintaining in accurate vertically spaced relationship a pair of frame elements.

A yet further feature of the invention is the provision of such a base frame structure including a pair of parallel spaced first elongate frame elements each having a first turned end portion, the end portions extending parallel to each other in the same direction from the axial plane of the frame elements, a pair of parallel spaced elongate second frame elements each having a second turned end portion, with the second end portions extending parallel to each other and in the same direction from the axial plane of the second frame elements, the second end portions further being substantially longer than the first end portions and having their free ends juxtaposed parallel to the first end portions with the second frame elements extending parallel to the first frame elements, the axial plane of the second frame elements being spaced from the plane of the first frame elements in a direction opposite to the direction of extension of the first end portions from the axial plane of the first frame elements, and weld means securing corresponding first and second end portions to each other in side-by-side relationship to retain the frame elements in spaced relationship.

Other features and advantages of the invention will be apparent from the following description, taken in connection with the accompanying drawing wherein:

FIG. 1 is a perspective view of a base portion of a grocery cart provided with a frame embodying the invention;

FIG. 2 is an enlarged fragmentary elevation thereof taken substantially along the line 2—2 of FIG. 1; and FIG. 3 is a horizontal section taken substantially along the line 3—3 of FIG. 2.

In the exemplary embodiment of the invention as disclosed in the drawing, a cart base structure generally designated 10 is shown to include a frame generally designated 11 comprising a lower, long U-shaped frame element 14 adapted to carry a platform (not shown) and an upper short U-shaped frame element 15 adapted to carry a basket (not shown). At its front portion, the lower frame element 14 carries a swivel wheel structure generally designated 12 and at its rear portion frame element 15 carries a pair of wheels 13.

More specifically, frame element 14 includes a pair of legs 16 and 17 extending horizontally rearwardly from a front bight portion 18. Leg 16 terminates rearwardly in a downturned end portion 19 and leg 17 terminates rearwardly in a similar downturned end portion 20. Frame element 15 includes a pair of legs 21 and 22 extending rearwardly from a front bight portion 23, leg 21 terminating rearwardly in a downturned end portion 24, and leg 22 terminating rearwardly in a downturned end portion 25. End portions 24 and 25 of the upper frame element 15 are substantially longer than the end portions 19 and 20 of the lower frame element 14 whereby when the lower ends 26 of the leg end portions 24 and 25 are juxtaposed parallel to the turned end portions 19 and 20 of the lower frame legs, the upper frame legs 21 and 22 are spaced above and parallel to the lower frame legs 16 and 17 respectively. As best seen in FIG. 1, legs 21 and 22 are substantially shorter than legs 16 and 17 whereby bight 23 is spaced substantially rearwardly of the vertical plane defined by the axis of the bight 18 of the lower frame element 14.

The downturned end portion of each of the lower frame legs 16 and 17 is rigidly secured to the corresponding lower end 26 of the downturned end portions of the upper frame legs 21 and 22. As best seen in FIG. 2, the end portions are preferably secured by weld means 27 extending substantially the length of the downturned end portions of the lower frame element thereby providing an extremely strong yet readily made connection. Wheel 13 is rotatably mounted in one of the downturned end portions; herein the wheel is rotatably mounted in the lower end 26 of the downturned end portions of the upper frame element 15. As the elongate weld 27 effectively forms the downturned end portions into an integral rigid assembly, the axles 28 of the wheels 13 are maintained accurately coaxially aligned notwithstanding the application of substantial forces to the base support structure 10. More specifically, as compared to the conventional single tube wheel support constructions, the double tube end portion structure of the present invention effectively more than doubles the resistance to twisting of the wheel support about a first, vertical axis, a second, horizontal axis parallel to legs 16, 17, 21 and 22, and a third, horizontal axis perpendicular to the second axis, whereby in and out canting of the wheels, e.g., undesirable toe-in; in and out bowing, e.g., undesirable camber; and forward or rearward displacement precluding proper nesting are effectively precluded.

The downturned end portions of each of the frames, as best seen in FIG. 2, terminate in a common horizontal plane whereby an automatic predetermined spacing of the plane of the upper frame leg and bight portions above the plane of the lower frame leg and bight portions is obtained, facilitating substantially the manufacture of the base structure.

For further facilitated manufacture and economy of construction, the frame elements are preferably formed of a material such as tubular steel which may be bent to the disclosed configuration. Swivel wheel structure 12 may be secured to the forward end of the lower frame element 14 by suitable means; herein the swivel wheel structure 12 is secured thereto by a cross rod support generally designated 29 of conventional construction.

While I have shown and described one embodiment of my invention, it is to be understood that it is capable of many modifications. Changes, therefore, in the construction and arrangement may be made without departing from the spirit and scope of the invention as defined in the appended claim.

I claim:

In a cart structure comprising: a pair of spaced, parallel first tubular frame elements each having a first downturned end portion; a pair of spaced, parallel tubular second frame elements each having a second downturned end portion, said second end portions being substantially longer than said first end portions and all of said end portions terminating at their lower ends substantially in a common horizontal plane, the second frame elements being spaced above and substantially parallel to the first frame elements, the length of said first turned end portions being at least equal to the cumulative dimension of the outside diameter of said first and second turned end portions, said end portions having a substantially circular cross-section throughout their lengths; elongated weld means extending from said lower end of said end portion upwardly substantially the length of said first turned end portion fixedly securing corresponding first and second end portions to each other in side-by-side relationship to retain said frame elements in said vertically spaced parallel relationship; and a pair of wheel devices secured to said second end portions including stub shafts extending through said second end portions adjacent said lower ends thereof, said shafts terminating at said second end portions to provide an unobstructed space between the second end portions, each of said shafts further carrying a wheel for rotation about a common, fixed horizontal axis and outwardly of said second end portions.

References Cited in the file of this patent

UNITED STATES PATENTS

| | | |
|---|---|---|
| D. 169,337 | Reece | Apr. 14, 1953 |
| 2,590,048 | Sides | Mar. 18, 1952 |
| 2,787,316 | Moore et al. | Apr. 2, 1957 |
| 2,842,374 | Benson et al. | July 8, 1958 |
| 2,882,062 | Hoedinghaus et al. | Apr. 14, 1959 |
| 2,898,123 | Davis et al. | Aug. 4, 1959 |
| 2,913,249 | Welsh | Nov. 17, 1959 |